United States Patent [19]
Zloter et al.

[11] Patent Number: 6,151,014
[45] Date of Patent: *Nov. 21, 2000

[54] SYSTEMS AND PROCESSING ALGORITHMS FOR ULTRASOUND TIME-OF-FLIGHT DIGITIZER SYSTEMS

[75] Inventors: Zahi Zloter, Holon; Gideon Shenholtz; Ron Serber, both of Tel Aviv, all of Israel

[73] Assignee: Pagasus Technologies Ltd., Holon, Israel

[ * ] Notice: This patent issued on a continued prosecution application filed under 37 CFR 1.53(d), and is subject to the twenty year patent term provisions of 35 U.S.C. 154(a)(2).

[21] Appl. No.: 09/288,058

[22] Filed: Apr. 7, 1999

Related U.S. Application Data

[62] Division of application No. 09/150,251, Sep. 10, 1998, which is a continuation of application No. 09/030,825, Feb. 26, 1998.

[51] Int. Cl.⁷ .............................. G09G 5/00; G08C 21/00
[52] U.S. Cl. ....................... 345/177; 345/176; 178/18.01; 178/18.04; 178/19.01; 178/19.02
[58] Field of Search ............................. 178/18.01, 18.02, 178/18.03, 18.04, 19.01, 19.02, 19.04; 345/173, 176, 177

[56] References Cited

U.S. PATENT DOCUMENTS

| | | |
|---|---|---|
| Re. 33,936 | 5/1992 | Miyamori et al. .......................... 178/18 |
| 3,134,099 | 5/1964 | Woo . |
| 3,382,480 | 5/1968 | Tsao et al. . |
| 3,396,366 | 8/1968 | Midlock et al. . |
| 3,613,066 | 10/1971 | Cacreman ................................... 178/18 |
| 3,706,850 | 12/1972 | Fisher et al. ............................... 178/18 |
| 3,838,212 | 9/1974 | Whetstone et al. ........................ 179/18 |

(List continued on next page.)

FOREIGN PATENT DOCUMENTS

| | | | |
|---|---|---|---|
| 0 169 53 | 1/1986 | European Pat. Off. ........ | G06K 11/06 |
| 0 229 637 | 7/1987 | European Pat. Off. ........ | G06K 11/06 |
| 0 229 637 A2 | 7/1987 | European Pat. Off. ........ | G06K 11/06 |
| 0 307 893 A2 | 3/1989 | European Pat. Off. ........ | G06K 11/06 |
| 0 600 575 A1 | 6/1994 | European Pat. Off. ........ | G06K 11/06 |
| 0 655 674 A2 | 5/1995 | European Pat. Off. ........ | G06F 3/033 |
| 2 698 191 | 5/1994 | France ............................ | G06F 15/66 |

OTHER PUBLICATIONS

"Radar On A Chip," Popular Science, Mar. 1996.
"Micropower Impulse Radar (MIR) Technology Overview," htt;://lasers.IInl.gov/lasers/idp/mir/files/MIR_info.ht (1996).
advertisement by Wacom, 1996.
advertisement by Calcomp, 1996.

*Primary Examiner*—Vijay Shankar
*Attorney, Agent, or Firm*—Mark M. Friedman

[57] ABSTRACT

A method and corresponding system for tracking variations in distance D calculated from time-of-flight measurements of a sequence of pulses of a pressure wave oscillation from a transmitter to a receiver identifies a state of synchronous operation by obtaining at least two time-of-flight measurements derived from successive pressure wave pulses which satisfy given synchronicity criteria. Successive time-of-flight measurements are then monitored to identify a shifted time-of-flight measurement which varies by at least half of the wave period from a predicted time-of-flight value calculated from a number of preceding time-of-flight measurements. A shift factor is then identified corresponding to an integer multiple of the wave period by which the shifted time-of-flight measurement must be corrected to obtain a corrected time-of-flight measurement falling within half of the wave period from the predicted time-of-flight value. The distance D calculated from the shifted time-of-flight measurement is then corrected by the product of the shift factor and the pressure wave wavelength.

30 Claims, 5 Drawing Sheets

U.S. PATENT DOCUMENTS

| | | | |
|---|---|---|---|
| 3,914,754 | 10/1975 | Kirk | 340/267 |
| 4,103,278 | 7/1978 | Satake et al. | 340/1 R |
| 4,246,439 | 1/1981 | Romein | 178/18 |
| 4,307,456 | 12/1981 | Ise et al. | 367/900 |
| 4,309,098 | 1/1982 | Shenk | 354/25 |
| 4,336,987 | 6/1982 | Shenk | 354/195 |
| 4,439,846 | 3/1984 | Rodriguez | 367/99 |
| 4,440,482 | 4/1984 | Shenk | 354/195.1 |
| 4,488,000 | 12/1984 | Glenn | 178/18 |
| 4,490,814 | 12/1984 | Shenk | 367/140 |
| 4,506,354 | 3/1985 | Hansen | 367/101 |
| 4,552,991 | 11/1985 | Hulls | 178/19 |
| 4,564,928 | 1/1986 | Glenn et al. | 367/117 |
| 4,570,033 | 2/1986 | Hulls | 178/19 |
| 4,578,674 | 3/1986 | Baker et al. | 340/710 |
| 4,665,282 | 5/1987 | Sato et al. | 178/18 |
| 4,670,751 | 6/1987 | Enokido et al. | 178/18 |
| 4,677,595 | 6/1987 | Obayashi et al. | 367/13 |
| 4,682,159 | 7/1987 | Davison | 340/709 |
| 4,695,833 | 9/1987 | Ogura et al. | 340/722 |
| 4,711,977 | 12/1987 | Miyamori et al. | 178/18 |
| 4,739,860 | 4/1988 | Kobayashi et al. | 181/123 |
| 4,750,584 | 6/1988 | Tanaka et al. | 181/123 |
| 4,758,691 | 7/1988 | De Bruyne | 178/18 |
| 4,772,764 | 9/1988 | Dorr | 178/18 |
| 4,777,329 | 10/1988 | Mallicoat | 178/18 |
| 4,853,715 | 8/1989 | Paschkis | 346/139 |
| 4,963,703 | 10/1990 | Phillips et al. | 178/19 |
| 5,023,408 | 6/1991 | Murakami et al. | 178/19 |
| 5,248,856 | 9/1993 | Mallicoat | 178/18 |
| 5,380,959 | 1/1995 | Knowles | 345/177 |
| 5,434,370 | 7/1995 | Wilson et al. | 178/18 |
| 5,448,263 | 9/1995 | Martia | 178/18 |
| 5,637,839 | 6/1997 | Yamaguchi et al. | 178/19.02 |
| 5,717,434 | 2/1998 | Toda | 345/177 |
| 5,750,941 | 5/1998 | Ishikawa et al. | 178/19.02 |

SYSTEMS AND PROCESSING ALGORITHMS FOR ULTRASOUND TIME-OF-FLIGHT DIGITIZER SYSTEMS

This application is a divisional application of Ser. No. 09/150,251, filed Sep. 10, 1998, which is itself a continuation-in-part of Ser. No. 09/030,825 which was filed on Feb. 26, 1998.

FIELD AND BACKGROUND OF THE INVENTION

The present invention relates to digitizer systems and, in particular, it concerns processing algorithms for ultrasound time-of-flight digitizer systems and systems employing such algorithms.

It is known to employ ultrasound time-of-flight measurements to measure distances in a two- or three-dimensional digitizer system. Such systems employ one transmitter which transmits ultrasound pulses which are received by receivers at a number of positions. Alternative configurations employ multiple transmitters with a single receiver. In either case, by measuring the time-of-flight of the pulses from the transmitter to the receiver, the distance between them can be calculated. Synchronization of the transmitter and receiver may be achieved either by a hard wired connection or by a wireless electromagnetic link.

Identification of the beginning of each ultrasound pulse received is non trivial. The reaction characteristic of transducer elements generally used to generate the pulses, together with dispersion of the signal during transit, cause the pulse to rise over a number of cycles before reaching its maximum amplitude. As a result, a threshold level set to reliably distinguish the pulse signals over background noise may be triggered at different stages of the pulse. Depending on the transmitter-receiver distance and various environmental conditions, the threshold may be exceeded sometimes during the first cycle, sometimes during the second, and sometimes during the third, leading to considerable imprecision (see FIGS. 1 and 2). For a typical operating frequency of about 40 kHz and taking the speed of sound to be 330 m/s, each cycle corresponds to a distance of about 8 mm. Such a range of error is unacceptable for typical applications such as digitizers for writing implements, computer mice and the like.

Conventional ultrasound digitizer systems are also somewhat inflexible in their hardware configurations. Typically, a predefined receiver arrangement is produced for each given application. The electronic components are then centralized in a control box. Such arrangements leave little or no flexibility to adapt systems to applications with larger dimensions.

There is therefore a need for systems and methods for accurately tracking variations in distance calculated from time-of-flight measurements of a sequence of pulses of a pressure wave from a transmitter to a receiver. It would also be highly advantageous to provide a modular receiver system in which the number of receiver units may be increased to cover any desired area.

SUMMARY OF THE INVENTION

The present invention is a processing algorithm for ultrasound time-of-flight digitizer systems, and a system employing such an algorithm.

According to the teachings of the present invention there is provided, a method for tracking variations in distance D calculated from time-of-flight measurements of a sequence of pulses of a pressure wave oscillation from a transmitter to a receiver, the pressure wave oscillation having a given wavelength and wave period, the method comprising: (a) identifying a state of synchronous operation by obtaining at least two time-of-flight measurements derived from successive pressure wave pulses which satisfy given synchronicity criteria; (b) monitoring successive time-of-flight measurements to identify a shifted time-of-flight measurement which varies by at least half of the wave period from a predicted time-of-flight value calculated from a number of preceding time-of-flight measurements; (c) identifying a shift factor corresponding to an integer multiple of the wave period by which the shifted time-of-flight measurement must be corrected to obtain a corrected time-of-flight measurement falling within half of the wave period from the predicted time-of-flight value; and (d) correcting the distance D calculated from the shifted time-of-flight measurement by the product of the shift factor and the pressure wave wavelength.

According to a further feature of the present invention, the time-of-flight measurements are made by a technique configured to identify a predetermined point within a cycle, such as by identifying a first zero crossing of a received signal after the signal has exceeded a given threshold value.

According to a further feature of the present invention, a shifted time-of-flight measurement for which the shift factor exceeds a predetermined maximum value, typically of less than 3, is discarded.

According to a further feature of the present invention, the corrected time-of-flight measurement is employed as a previous time-of-flight measurement for the step of monitoring performed on a subsequent time-of-flight measurement.

According to a further feature of the present invention, the state of synchronous operation is identified by obtaining at least three time-of-flight measurements derived from successive pressure wave pulses for which successive time-of-flight measurements vary by less than half of the wave period.

According to a further feature of the present invention, the state of synchronous operation is identified by obtaining at least three time-of-flight measurements derived from successive pressure wave pulses which vary substantially linearly.

According to a further feature of the present invention, the predicted time-of-flight value is calculated by geometrical extrapolation from at least two previous time-of-flight measurements, and preferably by extrapolation of a second order polynomial fitting the previous three time-of-flight measurements.

According to a further feature of the present invention, at least one supplementary shift test is performed, the step of correcting being performed selectively in response to the supplementary shift test.

The supplementary shift test may include determining an order in which a positive and a negative signal amplitude threshold are exceeded, or may include: (a) determining at least one peak signal amplitude occurring after a signal amplitude threshold is exceeded; and (b) calculating whether the peak signal amplitude differs from that of a corresponding peak signal amplitude from a previous pulse by more than a predefined ratio.

According to a further feature of the present invention, the transmitter is associated with a drawing implement which includes a contact switch for identifying operative contact between the drawing implement and a surface, the sequence of pulses being initiated in response to identification of the operative contact, the method further comprising continuing transmission of the sequence of pulses for a given delay period, typically at least about ½ second, after the contact switch has ceased to indicate the operative contact so as to preserve the state of synchronous operation during intermittent contact.

There is also provided according to the teachings of the present invention, a system for processing timing information and a received signal corresponding to a sequence of pulses of a pressure wave oscillation received by a receiver to track variations in a distance D calculated from time-of-flight measurements of the pulses, the pressure wave oscillation having a given wavelength and wave period, the system comprising: (a) a signal processor for processing the received signal to derive an effective time-of-arrival for each pulse; (b) a timing module associated with the signal processor, the timing module being configured to derive a time-of-flight for each pulse from the timing information and the effective time-of-arrival; (c) a synchronous operation module associated with the timing module and configured to analyze the times-of-flight to identify a state of synchronous operation when at least two successive pressure wave pulses satisfy predefined synchronicity criteria; (d) a monitoring massociated with the timing module and configured to monitor successive time-of-flight measurements to identify a shifted time-of-flight measurement which varies by at least half of the wave period from a predicted time-of-flight value calculated from a number of preceding time-of-flight measurements; (e) a shift factor module associated with the monitoring module and configured to identify a shift factor corresponding to an integer multiple of the wave period by which the shifted time-of-flight measurement must be corrected to obtain a corrected time-of-flight measurement falling within half of the wave period from the predicted time-of-flight value; and (f) a correction module associated with the timing module and configured to correct the distance D calculated from the shifted time-of-flight measurement by the product of the shift factor and the pressure wave wavelength.

According to a further feature of the present invention, the predefined synchronicity criteria include that, for first, second and third time-of-flight measurements calculated from a first, a second and a third successive pulse, respectively, a difference between the first and the second time-of-flight measurements and a difference between the second and the third time-of-flight measurements are both less than half of the wave period, or that at least three time-of-flight measurements derived from successive pressure wave pulses vary substantially linearly.

According to a further feature of the present invention, the signal processor is configured to identify a predetermined point within a cycle as the effective time-of-arrival. This point typically corresponds to a first zero crossing of a received signal after the signal has exceeded a given threshold value.

According to a further feature of the present invention, the signal processor performs at least one supplementary shift test, the correction module being configured to correct the distance D selectively in response to the supplementary shift test. This test may include determining an order in which a positive and a negative signal amplitude threshold are exceeded, or may include: (a) determining at least one peak signal amplitude occurring after a signal amplitude threshold is exceeded; and (b) calculating whether the peak signal amplitude differs from that of a corresponding peak signal amplitude from a previous pulse by more than a predefined ratio.

According to a further feature of the present invention, the monitoring module calculates the predicted time-of-flight value by geometrical extrapolation from at least two previous time-of-flight measurements, and typically, by extrapolation of a second order polynomial fitting the previous three time-of-flight measurements.

There is also provided according to the teachings of the present invention, a transmitter device for use with a system for digitizing operative strokes of a hand-held drawing implement, the drawing implement having a body and an operative tip, the transmitter device comprising: (a) a housing with an aperture, the housing being configured for receiving a portion of the body of the drawing implement with its operative tip extending through the aperture; (b) a normally-closed switch deployed so as to be opened by relative movement between the drawing implement and the housing resulting from pressure applied to the operative tip; and (c) a primary spring deployed to bias the drawing implement to a forward position in which the switch is closed.

According to a further feature of the present invention, there is also provided a secondary spring, weaker than the primary spring, deployed to act upon the drawing implement in a rearward direction so as to suspend the drawing implement within the housing.

According to a further feature of the present invention, there is also provided a centering element associated with the primary spring and providing an abutment surface configured to align a rear end of the drawing implement centrally within the housing.

There is also provided according to the teachings of the present invention, a system for identifying the position of a transmitter of a pulsed pressure-wave signal in at least two dimensions, the system comprising a plurality of interconnected modular receiver units, each of the modular receiver units including: (a) a pressure-wave receiver configured to convert a received pressure-wave signal into an electrical signal; (b) a signal processor associated with the pressure-wave receiver and configured to process the electrical signal to generate a detection output indicative of reception of a pulse of the pulsed pressure-wave signal; (c) a timing module associated with the signal processor and responsive to the detection output and an externally supplied synchronization input to measure a time-of-flight of the pulse; and (d) an output module associated with the timing module and configured to output data related to the time-of-flight.

According to a further feature of the present invention, the plurality of interconnected modular receiver units are interconnected by a common data line, the output module of each of the modular receiver units being configured to provide a cascade trigger function for triggering sequential transmission of the output data by all of the modular receiver units along the common data line.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a processing algorithm for an ultrasound time-of-flight digitizer system, and a corresponding system. The invention also provides a simple technique for encoding information in an electromagnetic synchronization signal.

The principles and operation of the systems, algorithms and techniques according to the present invention may be better understood with reference to the drawings and the accompanying description.

Before turning to the techniques and systems of the present invention, it should be noted that the present invention is applicable to any situation where distance from a transmitter to a receiver is measured by the time-of-flight of a pressure-wave pulse. In a minimal case, this could be a single transmitter/receiver pair. Typically, however, such systems employ at least two receivers for two-dimensional measurement, or at least three receivers for three-dimensional measurement. Alternatively, multiple transmitters may be used with a single receiver. In any case, the techniques of the invention relate primarily to processing of signals received by one receiver originating from one transmitter which may be applied to any transmitter/receiver pair the system.

Figure 1:
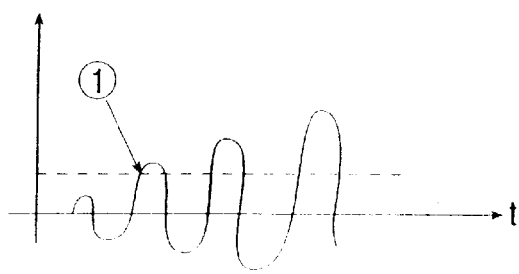
FIG. 1 is a plot of ultrasound signal amplitude against time for the beginning of a pulse in which a threshold is exceeded during a second cycle of the pulse.
Figure 2:
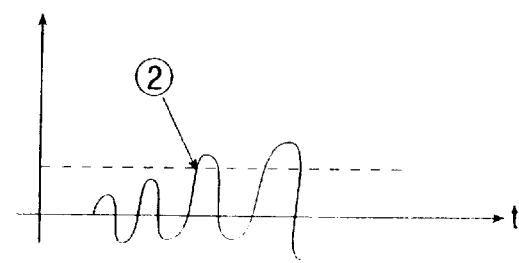
FIG. 2 is a plot of ultrasound signal amplitude against time for the beginning of a pulse in which a threshold is exceeded during a third cycle of the pulse.

Referring now to the drawings, FIGS. 1 and 2 show the beginnings of two ultrasound pulses as the amplitude grows over several cycles. As explained earlier, a fixed amplitude threshold may be exceeded at various different stages of the pulse amplitude envelope. In the example shown here, the threshold is exceeded during the second cycle of the pulse in FIG. 1, but only in the third cycle of the pulse in FIG. 2. Transitions between cycles such as shown frequently give rise to significant discontinuities or "jumps" in the measured distance.

Figure 3:
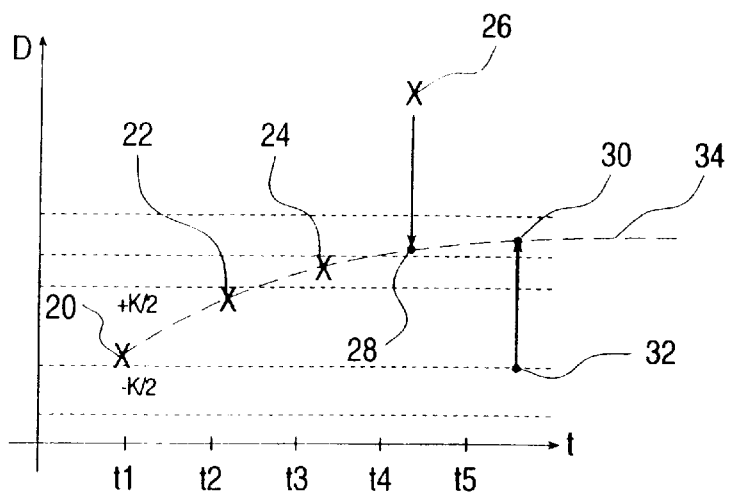
FIG. 3 is a plot of distance against time for successive pulses illustrating a first aspect of an algorithm according to the present invention.

To address this problem, the present invention provides a method for tracking variations in distance D calculated from time-of-flight measurements of a sequence of pulses of a pressure wave oscillation from a transmitter to a receiver. In general terms, the method includes identifying a state of synchronous operation by obtaining at least two time-of-flight measurements derived from successive pressure wave pulses satisfying some predefined synchronicity criteria. One preferred set of synchronicity criteria is that at least three time-of-flight measurements derived from successive pressure wave pulses for which successive time-of-flight measurements vary by less than half of the wave period k. Thus, referring to FIG. 3, the first time-of-flight measurement 20 taken at $t_1$ is used to define a range of $\pm k/2$ about the measured value. The subsequent time-of-flight measurement 22 at $t_2$ is then compared to this range. When two successive measurements each fall within this range from the previous readings, the system operation is defined to be synchronous.

Parenthetically, it should be noted that these criteria for synchronous operation are neither absolutely necessary nor exclusive. Thus, for example, it may be desired to supplement these criteria by allowing alternative criteria also defined as "synchronous operation". In one example, linear variation of D over three successive measurements may be considered synchronous operation even though the change in D may exceed $\pm k/2$ between measurements.

After entering synchronous operation, successive time-of-flight measurements are monitored to identify the first time-of-flight measurement to lie outside the k/2 range from a predicted time-of-flight value calculated from a number of preceding time-of-flight measurements. In this case, the first so-called "shifted time-of-flight measurement" 26 occurs at $t_4$. The predicted time-of-flight value may be calculated in a number of ways. Preferably, the calculation is based on a geometrical extrapolation from at least two previous distance measurements. In one particularly effective implementation, the extrapolation is based on a second order polynomial fitting the previous three time-of-flight measurements.

The method then identifies a shift factor corresponding to an integer multiple of the wave period k by which the shifted time-of-flight measurement must be corrected to obtain a corrected time-of-flight measurement falling within half of the wave period from the preceding time-of-flight measurement. In this case, a shift factor of −1 is required. Distance D, calculated from the shifted time-of-flight measurement, is then corrected by the product of the shift factor and the pressure wave wavelength to map shifted time-of-flight measurement 26 to corrected measurement 28. An assumption is normally made that subsequent measurements should also be corrected by the same shift factor until a new mismatch to the predicted value is encountered.

Clearly, the shift factor used in this method should be limited to some reasonable value. It is much more likely that a sudden unpredicted change in measured distance of multiple wavelengths originates from sound interference or a momentary malfunction than from multiple shifts in the cycle of detection. Typically, a variation of only one, or at most, two cycles between detections would be expected.

It should be noted that the corrected value 28 is then used in the prediction of the subsequent time-of-flight value. The initial calculation will assume the same shift factor as used for the previous measurement. If, however, as shown here, the subsequent automatically-corrected measurement 32 calculated using the same shift factor lies more than half a wavelength from the predicted value, a reverse shift factor will be used to return the measurement to the predicted value 30.

Conceptually, this method provides a particularly simple solution to the problem of discontinuities due to transitions between cycles of detection. Assuminng that the period between pulses is sufficiently small that distances moved between pulses are always less than k/2, a jump in excess of k/2 is a strong indication that a transition between cycles of detection has occurred. In principle, cumulative correction of such jumps to bring each step within the required range from the previous measurement should provide a complete solution to the problem. In practice, certain situations such as extreme acceleration of the transmitter unit may lead to mistaken corrections. Various refinements are preferably provided to deal with such problematic cases, as will now be described.

The refinements to the present invention to address problems of this type may be subdivided into two categories. Firstly, steps are taken to standardize and stabilize the detection process, thereby reducing the proportion of anomalous measurements. Secondly, as an alternative, or preferably at the same time, the "correction" of measurements based on the primary algorithm described above may be made conditional upon performance of at least one supplementary shift test designed to verify the correction.

With respect to standardization and stabilization of the detection process, time-of-flight measurements according to the present invention are preferably made by a technique configured to identify a predetermined point within a cycle. The simplest technique of this sort is to identify a first zero crossing of the received signal after the signal has exceeded a given threshold value.

With respect to supplementary shift tests, a number of possible approaches exist, each of which may be used alone or in combination with others.

Figure 4A:
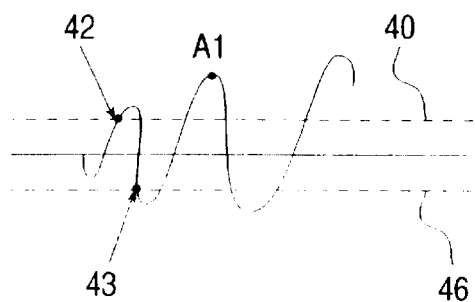
FIGS. 4A and 4B are plots of ultrasound signal amplitude against time for the beginning of two pulses illustrating the use of a positive and negative threshold technique according to the present invention.
Figure 4B:
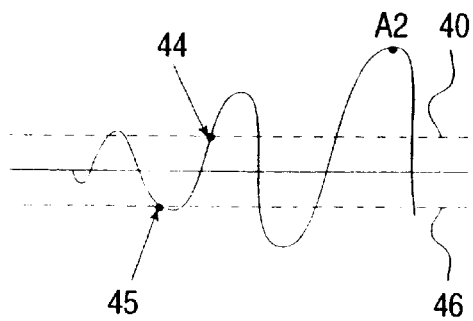

A first supplemental shift test is illustrated in FIGS. 4A and 4B. FIG. 4A shows a signal in which a positive threshold 40 is exceeded in the first cycle at point 42 whereas FIG. 4B shows exceedance in the second cycle at point 44. These two cases are preferably distinguished according to the present invention by adding a corresponding negative threshold 46 and determining an order in which the positive and the negative signal amplitude thresholds are exceeded. Thus, in FIG. 4A, positive threshold 40 is exceeded before negative threshold 46 is exceeded at point 43. In FIG. 4B, on the other hand, negative threshold 46 is exceeded first at point 45. This switch-over in order may be taken as indicative that a change in detection cycle has occurred.

Figure 5A:
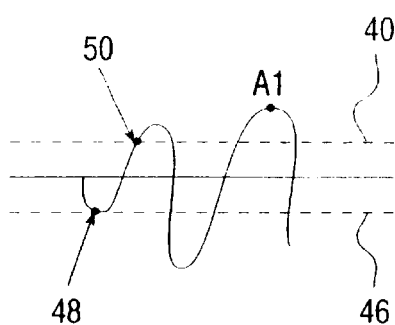
FIGS. 5A and 5B are plots of ultrasound signal amplitude against time for the beginning of two further pulses illustrating a refinement of the technique of FIGS. 4A and 4B employing peak amplitude detection.
Figure 5B:
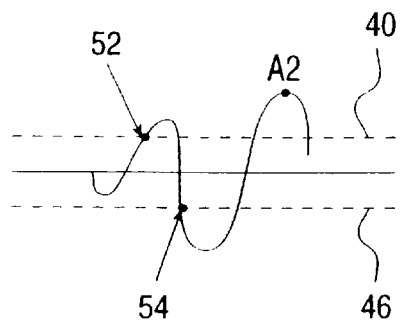

FIGS. 5A and 5B, on the other hand, show that this last approach alone is not always sufficient. Specifically, FIG. 5A shows a negative detection at point 48 followed by a positive detection at point 50. FIG. 5B, on the other hand, shows a positive detection at point 52 followed by a negative detection at point 54. In both cases, however, the signal has been detected during the first cycle of the signal.

To address this shortcoming, as an alternative to, or further refinement of, the order-based algorithm of FIGS. 4A and 4B, the at least one supplementary shift test preferably includes determining at least one peak signal amplitude occurring after a signal amplitude threshold is exceeded and comparing this peak amplitude with a corresponding amplitude from the previous detection. Thus, taking FIGS. 5A and 5B as detections of successive pulses, the peak signal amplitudes measured after detection $A_1$ and $A_2$, respectively, are relatively close in magnitude. In the successive pulses of FIGS. 4A and 4B, on the other hand, the second peak amplitude $A_2$ is significantly greater than $A_1$. Thus, a ratio above a given predefined value between peak amplitude mefrom successive detections may be taken as an indication of change in detection cycle. A twin criteria of positive-negative threshold exceedance reversal and significant variation in peak amplitude after detection, used together, may provide a particularly robust confirmation algorithm for suspected detection cycle transitions.

Figure 6:
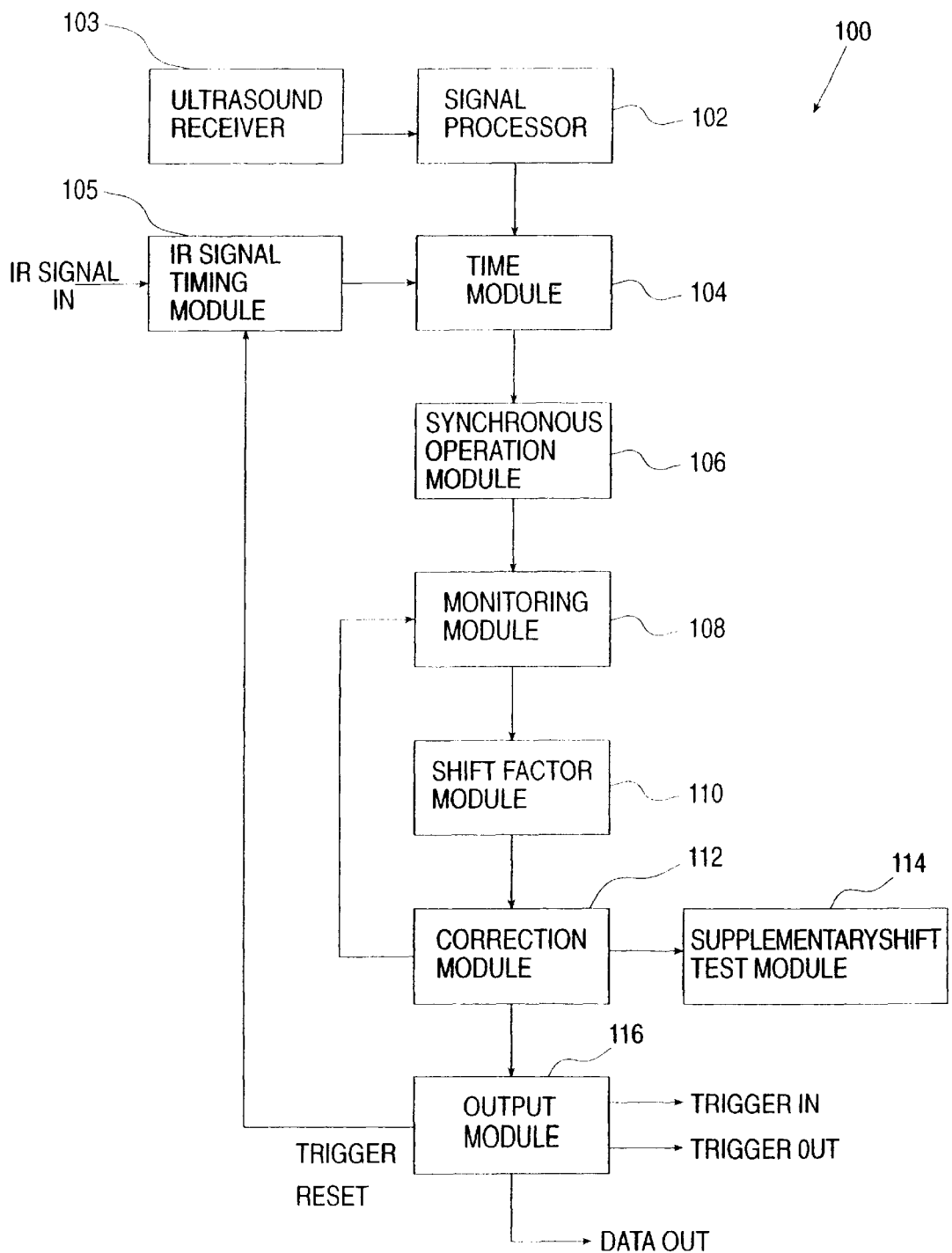
FIG. 6 is a block diagram of a receiver module from a system, constructed and operative according to the teachings of the present invention, for tracking variations in a distance D calculated from time-of-flight measurements of pressure-wave pulses.

Turning now to FIG. 6, it will be appreciated that the algorithms described above may be implemented in a wide range of ways. The system of the invention is typically made up from a number of modules, each of which may be implemented in a wide range of forms. These include software modules, which are software programs performing the functions of the system as described below. These software modules should be written in a suitable programming language, such as C or C++, which is compatible with the operating system of the computer on which these modules are being run. The exact selection of such a programming language could easily be made by one of ordinary skill in the art. Hereinafter, the term "computer" includes, but is not limited to, personal computers (PC) having an operating system such as DOS, Windows™, OS/2™ or Linux; Mackintosh™ computers; computers having JAVA™-OS as the operating system; and graphical workstations such as the computers of Sun Microsystems™ and Silicon Graphics™, and other computers having some version of the UNIX operating system such as AIX or SOLARIS™ of Sun Microsystems™; or any other known and available operating system, as well as any other suitable combination of computational hardware and an operating system. Hereinafter, the term "Windows™" includes but is not limited to Windows95™, Windows 3.x™ in which "x" is an integer such as "1", Windows NT™, Windows98™, Windows CE™ and any new or upgraded versions of these operating systems by Microsoft Inc. (Seattle, Wash., USA), as well as any other operating system from Microsoft Inc.

In addition, the modules could be implemented as hardware alone, or as a combination of hardware and software known as "firmware", which includes software programming instructions burnt onto a ROM (read only memory) chip. Various of the modules may also include volatile or non-volatile memory or other storage devices of any kind as required. The precise implementation could easily be performed by one of ordinary skill in the art. In any case, the modules are described herein according to function rather than strictly as physically separate entities.

Figure 7:
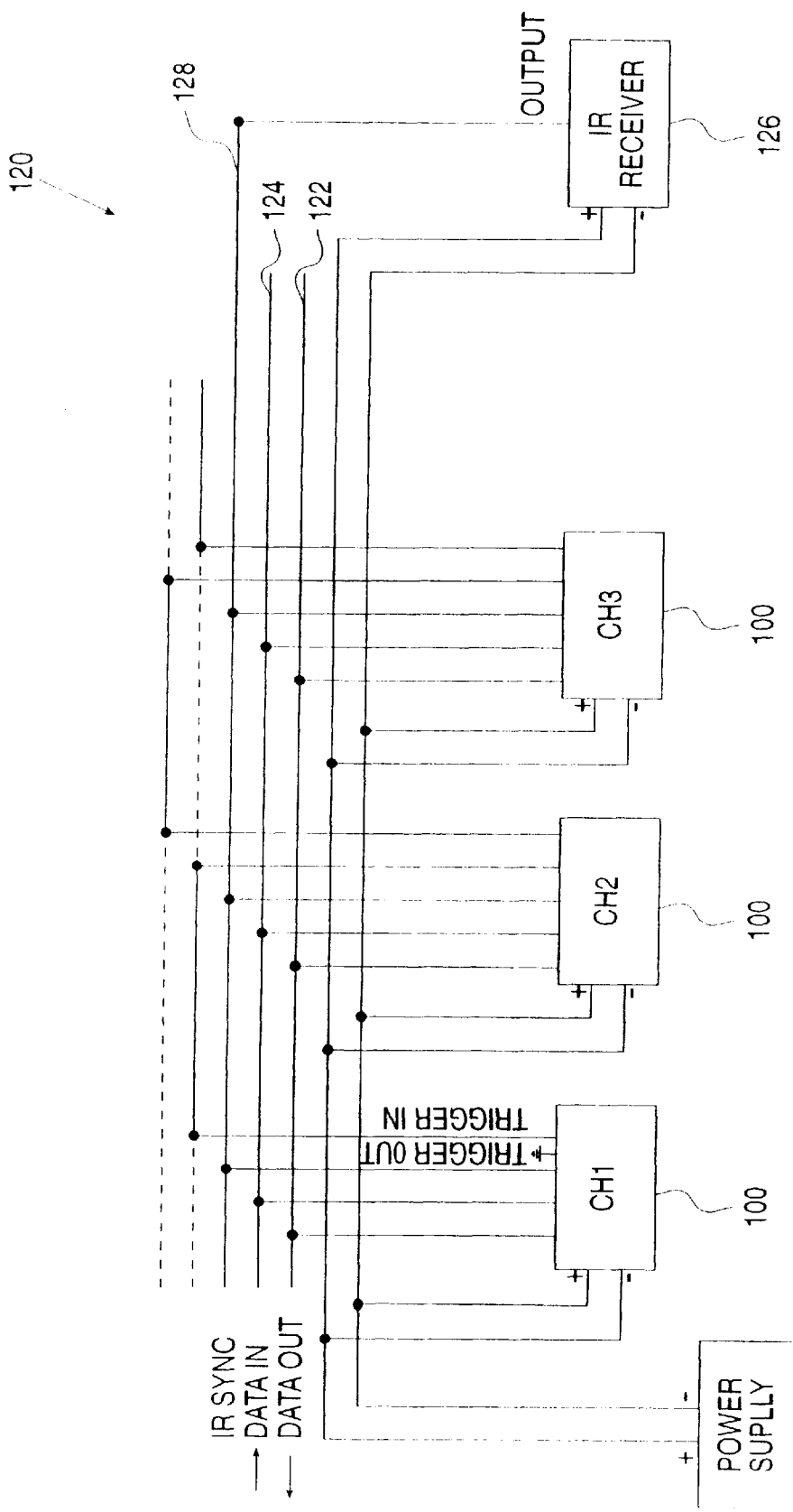
FIG. 7 is a block diagram of a system including a number of the modules of FIG. 6.

In one particularly advantageous implementation which will be illustrated in FIGS. 6 and 7, a digitizer system is implemented using a number of modular receiver units 100 which can be connected together in a series of any required length to cover a given area. Typically at least two units are used, and preferably at least four. It has also been found advantageous to use an even number of units deployed so that pairs of units are optimally deployed with overlapping "fields of view" to receive from each subsection of the area.

More specifically, in the implementation of FIG. 6, receiver unit 100 is configured to track variations in a distance D calculated from time-of-flight measurements of pressure-wave pulses according to the techniques of the present invention described above. Thus, receiver unit 100 has a signal processor 102 for processing the signal from ultrasound receiver 103 to derive an effective time-of-arrival for each pulse, typically taken as a first zero crossing of a the received signal after the signal has exceeded a given threshold value. A timing module 104 then derives a time-of-flight for each pulse from the effective time-of-arrival and pulse timing information, preferably derived from a timing input 105 typically originating from an infrared receiver. The time-of-flight values are then processed by a synchronous operation module 106, a monitoring module 108, a shift factor module 110 and a correction module 112 to adjust for jumps due to changes in detection cycle. Specifically, synchronous operation module 106 analyses the times-of-flight to identify a state of synchronous operation, and monitoring module 108 monitors successive time-of-flight measurements to identify a shifted time-of-flight measurements. Shift factor module 110 then identifies a shift factor corresponding to an integer multiple of the wave period by which the shifted time-of-flight measurement must be corrected to obtain a corrected time-of-flight measurement falling within half of the wave period from the predicted time-of-flight measurement. Typically, shift factor module 110 is configured to designate as erroneous any shifted time-of-flight measurement for which the shift factor exceeds two, or preferably one. Correction module corrects the distance D calculated from the shifted time-of-flight measurement accordingly. The corrected value of D is then preferably fed back to monitoring module 108 to be used as the previous time-of-flight measurement for monitoring a subsequent time-of-flight measurement.

With regard to the supplementary shift tests described earlier, these are preferably implemented as part of signal processor 102. Alternatively, or additionally, a separate supplementary shift test module 114 may be provided.

To facilitate the modular connection of receiver units 100 as mentioned above, communication of distance measurements to an external device, such as a computer, is preferably managed by an output module 116. Output module 116 preferably has input, output and reset trigger connections for controlling a transmission sequence which enables a large number of units to be connected on common data lines, as will be described. Output module 116 also provides data output and optionally data input connections, which may be implemented with desired connection format such as an RS232 interface.

FIG. 7 shows schematically how a number of receiver units 100 are combined in a system 120 with common data lines 122 and 124. The trigger output of each unit is connected to the trigger input of the next, with the trigger input of the first unit ("channel 1") being connected to ground. The output from an IR receiver 126 supplied along IR sync. line 128 to the IR signal timing module 105 of each unit 100 generates a trigger reset. This trigger reset is effective to prime the unit to wait for the next received pressure-wave pulse and to set its trigger output to "high". After receipt of a pressure-wave signal and the calculation of a corresponding distance measurement, each receiver unit 100 is configured to wait until its trigger input goes "low" (i.e., ground) and then to transmit its distance measurement data. Immediately after transmission, it sets its trigger output to low. As a result, a chain response is generated in which each channel transmits its data and then triggers transmission of the next channel. The external device can readily identify which data comes from which receiver unit by the order of transmission which is dictated by the connections of trigger outputs and inputs and always starts from the channel which is permanently connected to ground. Additional identification information may also be included in the data transmission.

It will be noted that the structure described provides great structural flexibility and simplicity. Since each receiver unit 100 performs only its own fairly simple signal processing and calculations, the internal structure of the units is simple and low cost to implement. Furthermore, since all receiver units are identical, production costs are minimized.

The modular nature of the system allows extension of the system to cover large areas without any structural modification other than addition of receiver units. The corresponding modifications required in triangulation algorithms to be performed by the external device are trivial. If desired, the external device may also be programmed to adapt automatically to the number of receiver units present.

Figure 8:
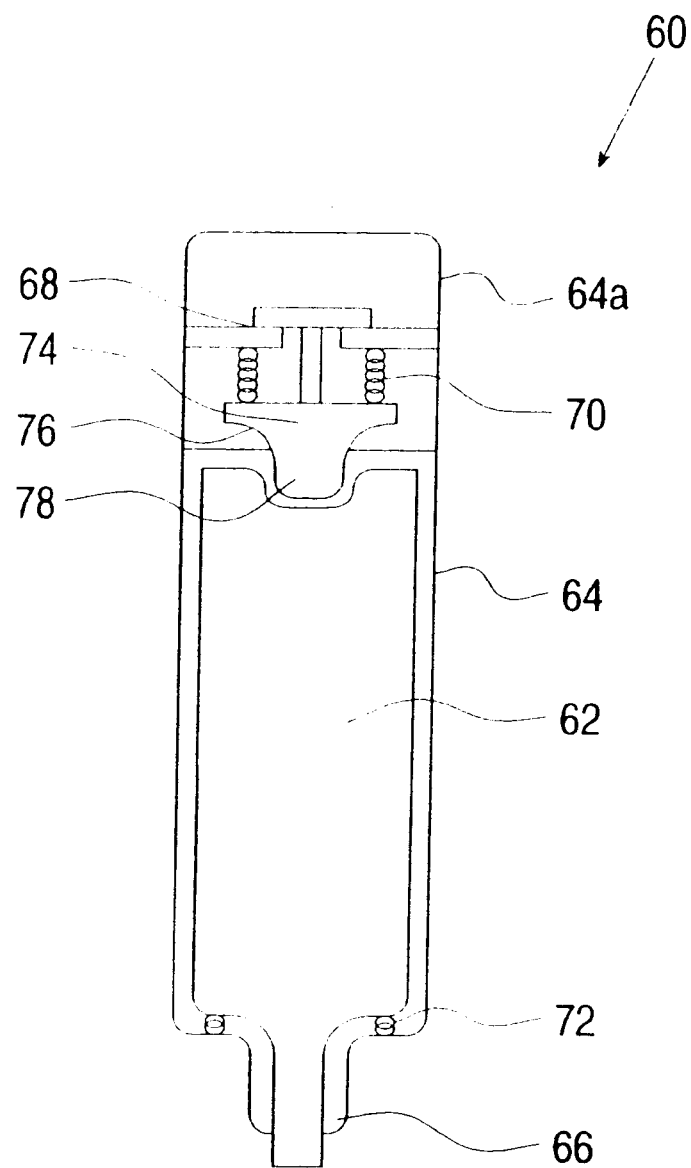
FIG. 8 is a schematic cross-sectional view through a transmitter device, constructed and operative according to the teachings of the present invention, for use with a system for digitizing operative strokes of a hand-held drawing implement.

Turning finally to FIG. 8, this shows a preferred structure of transmitter device 60 for use with a system for digitizing operative strokes of a hand-held drawing implement 62. Transmitter device 60 includa housing 64 configured for receiving at least a portion of the body of the drawing implement 62 with its operative tip extending through an aperture 66. A particular feature of transmitter device 60 is that operative contact of the drawing implement tip against a surface is identified by use of a normally-closed switch 68. The term "normally-closed switch" is used to refer to a switch structure in which movement is detected by the breaking of a circuit normally completed by the switch. In this case, normally-closed switch 68 is deployed so as to be opened by relative movement between drawing implement 62 and housing 64 resulting from pressure applied to the operative tip. A primary spring 70 is deployed to bias drawing implement 62 to a forward position in which switch 68 is closed.

In contrast to conventional microswitches which switch after a predefined distance of travel, the use of a normally-closed switch provides immediate detection of contact with a surface by detecting the onset of relative movement between the drawing implement and the housing.

Preferably, a secondary spring 72, weaker than primary spring 70, is deployed to act upon drawing implement 62 in a rearward direction, i.e., tending to retract the operative point. The opposition and alignment of springs 70 and 72 serves to suspend the drawing implement properly aligned within housing 64 and allows the housing to accommodate drawing implements with a range of lengths. At the same time, the stronger primary spring 70 ensures that switch 68 returns to its closed state whenever contact force is not applied to the operative tip of drawing implement 62.

In the example shown here, normally-closed switch 68 is deployed in a removable cover portion 64a of housing 64. However, one ordinarily skilled in the art will appreciate that alternative implementations may also be used in which switch 68 is located at other positions, for example, near aperture 66.

A further preferred feature of transmitter device 60 is a centering element 74, typically associated with primary spring 70, which provides an abutment surface 76 shaped to align a rear end of drawing implement 62 centrally within the cylindrical hollow of housing 64. This ensures alignment of drawing implements within housing 64 independent of their outer dimensions and avoids frictional contact between the drawing implement and the walls of housing 64 which could otherwise interfere with operation of switch 68. Preferably, abutment surface 76 is formed with a tapered projection 78 which, under the action of springs 70 and 72, is self centering in the axial recess common to the rear end of most marker type drawing implements.

With regard to the circuitry of the transmitter unit, this is typically relatively simple, requiring only synchronous pulsed transmission of the pressure-wave and electromagnetic transmitters. Optionally, the electromagnetic signal can carry additional information such as pen color and the states of one or more switches.

A specific problem in implementation of the transmitter relates to maintaining synchronicity during brief operative strokes. In order to avoid wasteful continuous transmission, drawing implements such as pens or erasers typically use a contact switch for identifying operative contact between the drawing implement and a surface. The sequence of ultrasound pulses is then initiated in when operative contact is formed. Since effective functioning of the present invention requires establishing "synchronous operation", the repeated stopping and starting of the ultrasound transmitter normally caused by short contact strokes leads to repeated loss of synchronicity.

To address this problem, transmission of the sequence of pulses is preferably continued for a given delay period, typically at least about ½ second, after the contact switch has ceased to indicate the operative contact. In this way the state of synchronous operation is preserved during intermittent contact. The status of the contact switch is then conveyed to the base unit separately, either through a hard-wired connection when present, or preferably via an electromagnetic link from the transmitter unit to a corresponding electromagnetic receiver. In the latter case, transmission both of the pressure-wave signals and of the electromagnetic signal are continued for the delay period.

It will be appreciated that the above descriptions are intended only to serve as examples, and that many other embodiments are possible within the spirit and the scope of the present invention.

What is claimed is:

1. A method for tracking variations in distance D calculated from time-of-flight measurements of a sequence of pulses of a pressure wave oscillation from a transmitter to a receiver, the pressure wave oscillation having a given wavelength and wave period, the method comprising:
   (i) identifying a state of synchronous operation by obtaining at least two time-of-flight measurements derived from successive pressure wave pulses which satisfy given synchronicity criteria;
   (ii) monitoring successive time-of-flight measurements to identify a shifted time-of-flight measurement which varies by at least half of the wave period from a predicted time-of-flight value calculated from a number of preceding time-of-flight measurements;
   (iii) identifying a shift factor corresponding to an integer multiple of the wave period by which said shifted time-of-flight measurement must be corrected to obtain a corrected time-of-flight measurement falling within half of the wave period from the predicted time-of-flight value; and
   (iv) correcting the distance D calculated from said shifted time-of-flight measurement by the product of said shift factor and the pressure wave wavelength.

2. The method of claim 1, wherein the time-of-flight measurements are made by a technique configured to identify a predetermined point within a cycle.

3. The method of claim 2, wherein the time-of-flight measurements are made by identifying a first zero crossing of a received signal after the signal has exceeded a given threshold value.

4. The method of claim 1, further comprising disregarding a shifted time-of-flight measurement for which said shift factor exceeds a predetermined maximum value.

5. The method of claim 4, wherein said predetermined maximum value is less than 3.

6. The method of claim 1, wherein said corrected time-of-flight measurement is employed as a previous time-of-flight measurement for said step of monitoring performed on a subsequent time-of-flight measurement.

7. The method of claim 1, wherein state of synchronous operation is identified by obtaining at least three time-of-flight measurements derived from successive pressure wave pulses for which successive time-of-flight measurements vary by less than half of the wave period.

8. The method of claim 1, wherein state of synchronous operation is identified by obtaining at least three time-of-flight measurements derived from successive pressure wave pulses which vary substantially linearly.

9. The method of claim 1, wherein said predicted time-of-flight value is calculated by geometrical extrapolation from at least two previous time-of-flight measurements.

10. The method of claim 1, wherein said predicted time-of-flight value is calculated by extrapolation of a second order polynomial fitting the previous three time-of-flight measurements.

11. The method of claim 1, further comprising performing at least one supplementary shift test, said step of correcting being performed selectively in response to said supplementary shift test.

12. The method of claim 11, wherein said at least one supplementary shift test includes determining an order in which a positive and a negative signal amplitude threshold are exceeded.

13. The method of claim 11, wherein said at least one supplementary shift test includes:
   (i) determining at least one peak signal amplitude occurring after a signal amplitudthreshold is exceeded; and
   (ii) calculating whether said peak signal amplitude differs from that of a corresponding peak signal amplitude from a previous pulse by more than a predefined ratio.

14. The method of claim 1, wherein the transmitter is associated with a drawing implement which includes a contact switch for identifying operative contact between the drawing implement and a surface, the sequence of pulses being initiated in response to identification of said operative contact, the method further comprising continuing transmission of the sequence of pulses for a given delay period after said contact switch has ceased to indicate said operative contact so as to preserve said state of synchronous operation during intermittent contact.

15. The method of claim 14, wherein said given delay period is at least about ½ second.

16. A system for processing timing information and a received signal corresponding to a sequence of pulses of a pressure wave oscillation received by a receiver to track variations in a distance D calculated from time-of-flight measurements of the pulses, the pressure wave oscillation having a given wavelength and wave period, the system comprising:
   (i) a signal processor for processing the received signal to derive an effective time-of-arrival for each pulse;
   (ii) a timing module associated with said signal processor, said timing module being configured to derive a time-of-flight for each pulse from the timing information and said effective time-of-arrival;
   (iii) a synchronous operation module associated with said timing module and configured to analyze said times-of-flight to identify a state of synchronous operation when at least two successive pressure wave pulses satisfy predefined synchronicity criteria;
   (iv) a monitoring module associated with said timing module and configured to monitor successive time-of-flight measurements to identify a shifted time-of-flight measurement which varies by at least half of the wave period from a predicted time-of-flight value calculated from a number of preceding time-of-flight measurements;
   (v) a shift factor module associated with said monitoring module and configured to identify a shift factor corresponding to an integer multiple of the wave period by which said shifted time-of-flight measurement must be corrected to obtain a corrected time-of-flight measurement falling within half of the wave period from the predicted time-of-flight value; and (vi) a correction module associated with said timing module and configured to correct the distance D calculated from said shifted time-of-flight measurement by the product of said shift factor and the pressure wave wavelength.

17. The system of claim 16, wherein said predefined syrnchronicity criteria include that, for first, second and third time-of-flight measurements calculated from a first, a second and a third successive pulse, respectively, a difference between said first and said second time-of-flight measurements and a difference between said second and said third time-of-flight measurements are both less than half of the wave period.

18. The system of claim 16, wherein said predefined synchronicity criteria include that at least three time-of-flight measurements derived from successive pressure wave pulses vary substantially linearly.

19. The system of claim 16, wherein said signal processor is configured to identify a predetermined point within a cycle as said effective time-of-arrival.

20. The system of claim 19, wherein said predetermined point corresponds to a first zero crossing of a the received signal after the signal has exceeded a given threshold value.

21. The system of claim 16, wherein said shift factor module is configured to designate as erroneous any shifted time-of-flight measurement for which said shift factor exceeds a predetermined maximum value.

22. The system of claim 21, wherein said predetermined maximum value is less than 3.

23. The system of claim 16, wherein said monitoring module is configured to employ said corrected time-of-flight measurement as the previous time-of-flight measurement for monitoring a subsequent time-of-flight measurement.

24. The system of claim 16, wherein said signal processor is configured to perform at least one supplementary shift test, said correction module being configured to correct the distance D selectively in response to said supplementary shift test.

25. The system of claim 24, wherein said at least one supplementary shift test includes determining an order in which a positive and a negative signal amplitude threshold are exceeded.

26. The system of claim 24, wherein said at least one supplementary shift test includes:

(i) determining at least one peak signal amplitude occurring after a signal amplitude threshold is exceeded; and (ii) calculating whether said peak signal amplitude differs from that of a corresponding peak signal amplitude from a previous pulse by more than a predefined ratio.

27. The system of claim 16, wherein said monitoring module calculates said predicted time-of-flight value by geometrical extrapolation from at least two previous time-of-flight measurements.

28. The system of claim 16, wherein said monitoring module calculates said predicted time-of-flight value by extrapolation of a second order polynomial fitting the previous three time-of-flight measurements.

29. A system for identifying the position of a transmitter of a pulsed pressure-wave signal in at least two dimensions, the system comprising a plurality of interconnected modular receiver units, each of said modular receiver units including:

(i) a pressure-wave receiver configured to convert a received pressure-wave signal into an electrical signal;

(ii) a signal processor associated with said pressure-wave receiver and configured to process said electrical signal to generate a detection output indicative of reception of a pulse of the pulsed pressure-wave signal;

(iii) a timing module associated with said signal processor and responsive to said detection output and an externally supplied synchronization input to measure a time-of-flight of said pulse; and (iv) an output module associated with said timing module and configured to output data related to said time-of-flight.

30. The system of claim 29, wherein said plurality of interconnected modular receiver units are interconnected by a common data line, said output module of each of said modular receiver units being configured to provide a cascade trigger function for triggering sequential transmission of said output data by all of said modular receiver units along said common data line.

* * * * *